Jan. 2, 1951  B. P. COOPER  2,536,353
TWO-PART RIVET
Filed Nov. 27, 1945

Inventor
Basil P. Cooper
By his Attorney

Patented Jan. 2, 1951

2,536,353

UNITED STATES PATENT OFFICE 2,536,353

TWO-PART RIVET

Basil Pomeroy Cooper, Leicester, England, assignor to United Shoe Machinery Corporation, Flemington, N. J., a corporation of New Jersey Application November 27, 1945, Serial No. 631,039
In Great Britain December 14, 1944

1 Claim. (Cl. 85—40)

The purpose of this invention is to provide improvements in two-part rivets of the type in which a pin having an upsetting head extends through a ductile sleeve member having an upsetting portion at one end and a head flange at the opposite end.

The pin, in a rivet of this category, serves initially to do the upsetting of the tail end of the sleeve member, but a portion of the pin is thereafter retained, if possible, in the installed sleeve member to reinforce its shear strength and, in some circumstances, to prevent the flow of liquid (e. g. water) or gas (e. g. air) through the sleeve member. Accordingly, each pin is used but once, and, since the upsetting technique used to install such a rivet requires the stem of the pin to be considerably longer than the sleeve member, some portion of the stem projects from the head end of the sleeve member to be severed and discarded after the rivet has been installed.

The improvements provided by the present invention are prompted by the problem of maintaining the two parts of a rivet in assembled relation both before and after the rivet is installed in a structure to be riveted. Prior to being installed, it is desired that the two parts shall be assembled in telescopic relation at the source where the rivets are made, and that this relation be maintained for the convenience of the operator of a riveting implement by which the rivet is to be installed.

The improvements hereinafter described provide for maintaining assembled relation of a pin cold forged from wire without being machined, and a sleeve member drawn from ductile sheet metal. The stem of such a pin may be smooth and uniformly cylindrical, but a novel feature of the sleeve member is a barrel one portion of which is smaller than another portion and provided with a head flange larger than the larger barrel portion. The entire barrel may be initially a little larger than the stem of the pin and of uniform wall-thickness, and the portion that is to be the smaller of the two may be squeezed by relatively movable die sections to reduce its internal diameter to a dimension slightly less than the size of the stem of the pin to be assembled therewith. When the stem is subsequently driven through the sleeve member the reduced portion of the latter will be slightly expanded by the stem and will have friction-tight engagement therewith. The tight relation thus obtained will not be lost in consequence of pulling the head of the pin into the larger portion of the barrel to install the rivet.

Referring to the drawing.

Figure 1:
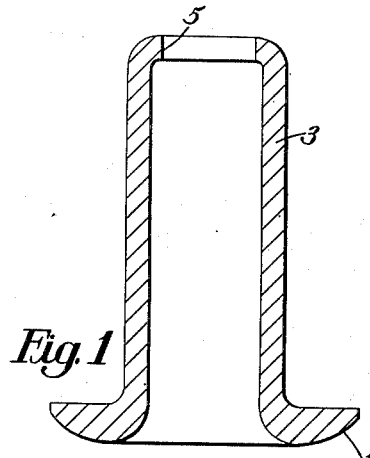
Fig. 1 represents a longitudinal section of the sleeve member of a rivet at the forming stage next prior to reducing the size of a portion of its barrel.
Figure 2:
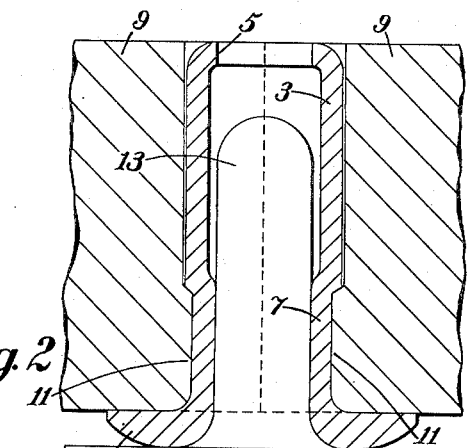
Fig. 2 represents a similar view in which the portion provided with a head flange is between a pair of squeezing dies and is reduced thereby to a diameter smaller than the portion above it.

The sleeve member represented in Fig. 1 comprises a head flange 1 and a cylindrical barrel 3 of uniform wall-thickness developed from ductile sheet metal by a series of drawing operations according to well-known practice. The end wall of this member has been punched out to provide a hole 5 to receive an upsetting pin. This hole is slightly smaller than the throat of the barrel because the punch used to make it cannot be quite as large as the throat without causing trouble in the punching operation. Consequently, an upsetting pin capable of sliding through the hole 5 will be too small to be gripped by any other portion of the sleeve member. Therefore, to prepare the sleeve member for the reception of an upsetting pin, a band 7 of the barrel 3 is squeezed or contracted as represented in Figs. 2 and 4.

Figure 3:
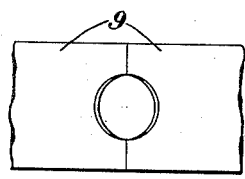
Fig. 3 is a top plan view, on a smaller scale, of the contiguous portions of the squeezing dies included in Fig. 2.

The band 7 adjoins the head flange 1, but before it is squeezed the sleeve member is placed on a cylindrical patrix 13 no larger than the hole 5, and preferably a little smaller. The squeezing may be done by a pair of cooperative die members 9, 9 (Figs. 2 and 3) movable toward each other. The upper portions of these die members have semicylindrical mated cavities that provide clearance for the sleeve member, but the lower portions have diametrically opposite operating formations 11, 11 that do the squeezing. Viewed as in Fig. 3 the formations 11, 11 are crescent-shaped, and they press opposite segments of the band 7 toward each other as far as the patrix 13 will permit. One such squeezing operation will produce an oval cross section of the deformed band of the barrel, but the minor diameter of this band will then be no larger than the hole 5. If a circular cross section of the deformed band is desired, it may be obtained by separating the die members, relatively turning them and the sleeve member 90° about the axis of the latter, and repeating the squeezing operation.

Figure 4:
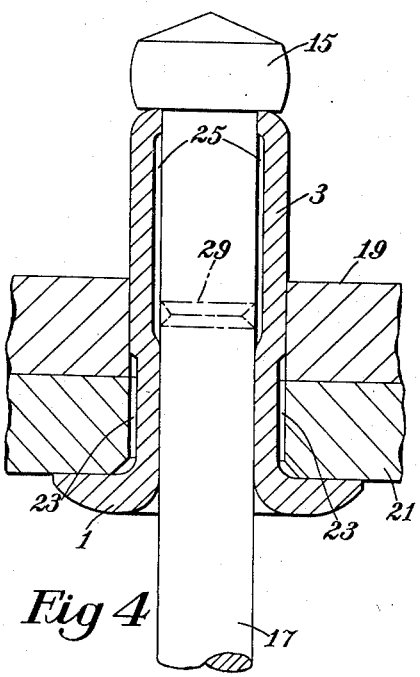
Fig. 4 is a sectional view that represents both members of a rivet as having been assembled, and as having been placed, but not finally installed, in a structure to be riveted.

Fig. 4 includes an upsetting pin comprising a head 15 and a smooth cylindrical stem 17 longer than the sleeve and of uniform diameter. Pins of this type may be made by cold forging wire stock, preferably a little larger than the smallest inside diameter of the contracted band 7 of the sleeve member. The band 7 will maintain friction-tight engagement with the stem 17 of a pin assembled with the sleeve member in telescopic relation, and if the two members are so assembled at the source where the rivets are made they will remain so despite normal handling. Consequently, when the operator of a rivet-installing implement takes up a rivet his duties will be simplified accordingly.

In Fig. 4 the rivet assemblage has been placed in a hole in a structure to be riveted, that structure being represented as comprising two layers 19 and 21 having an aggregate thickness a little greater than the length of the friction-tight band 7 of the sleeve member. Since the hole in which the sleeve member is placed must be as large as the larger of the two barrel portions it will provide two segmental spaces 23, 23 or one annular space surrounding the smaller barrel portion. At the same time, the throat of the larger barrel portion will provide an annular space 25 surrounding a portion of the stem 17.

Figure 5:
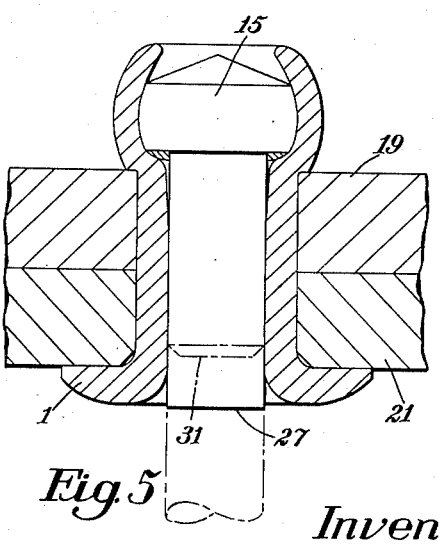
Fig. 5 is a sectional view that represents the rivet as having been finally installed in the riveted structure.

If, now, the rivet be installed with an implement comprising an anvil for bracing the flange 1, and means for pulling the stem 17 (e. g. see U. S. Patent No. 1,829,696, Wylie et al., October 27, 1931), the head 15 will be drawn toward the flange, but before it can enter the sleeve member it will compress the latter endwise, thereby packing rivet metal into the space or spaces 23 and into the space 25 within the confines of the layer 19. Finally, the unconfined portion of the barrel, unable to withstand the maximum compressive force, will yield radially away from the stem 17 and the head 15 will enter it, with the result illustrated in Fig. 5.

The projecting portion of the stem 17 may be cut off adjacent to the flange 1 to leave a plug 27 in the sleeve member. The friction-tight barrel portion of the sleeve member will continue to grip this plug regardless of failure of the tail end of the sleeve member to close in over the head 15 as illustrated. An alternative expedient, preferred by some to do away with cutting off the stem 17, may be provided by forming an annular groove 29 (broken lines in Fig. 4) in the stem. The stem will break at this point, provided the projecting portion thereof is pulled with sufficient force after the upsetting operation has been accomplished. This practice will leave a plug 31 (Fig. 5) in the friction-tight portion of the sleeve member.

Having described my invention, what I claim as new and desire to secure by Letters Patent of the United States is:

A two-part rivet comprising a sleeve member of ductile material and a smooth longitudinally slidable pin in telescopic relation, the sleeve member having adjoining barrel portions of substantially uniform wall thickness but different internal diameters, and said pin including both an upsetting head extending externally for engagement with, and retraction into, an in-turned throat in the barrel portion of larger internal diameter and a cylindrical shank having friction-tight engagement with the barrel portion of smaller internal diameter.

BASIL POMEROY COOPER.

REFERENCES CITED

The following references are of record in the file of this patent:

UNITED STATES PATENTS

| Number | Name | Date |
| --- | --- | --- |
| 641,118 | Kelly | Jan. 9, 1900 |
| 2,392,133 | Ecklund | Jan. 1, 1946 |
| 2,397,111 | Huck | Mar. 26, 1946 |
| 2,415,417 | Collins | Feb. 11, 1947 |

FOREIGN PATENTS

| Number | Country | Date |
| --- | --- | --- |
| 106,169 | Great Britain | May 17, 1917 |